UNITED STATES PATENT OFFICE.

JOHN F. COE, OF RALEIGH, NORTH CAROLINA.

PAINT COMPOUND.

1,109,623.  Specification of Letters Patent.  Patented Sept. 1, 1914.

No Drawing. Application filed August 4, 1911, Serial No. 642,248. Renewed March 16, 1914. Serial No. 825,152.

*To all whom it may concern:*

Be it known that I, JOHN F. COE, a citizen of the United States, residing at Raleigh, in the county of Wake and State of North Carolina, have invented certain new and useful Improvements in Paint Compounds, of which the following is a specification.

My invention is an improved paint and consists of the ingredients substantially in the proportions hereinafter specified.

In making my improved paint I employ oil and tar 50 gal., Princes metallic (oxid of iron, hematite ore) 350 lb., gloss oil 5 gal., Japan drier $7\frac{1}{2}$ gal.

The gloss oil is a rosin oil which is made by the distillation of rosin by itself, and is one of the best adhesives known, and gives a rich gloss to the paint when dry. The Princes metallic gives body and solidity and color to the paint. The selection of this mineral is not by chance or for its color merely. In its present relation, its absorptive qualities are particularly adapted to the sometimes sticky somewhat viscous character of the other ingredients. It keeps them from running or moving until the paint has set. The oil of tar is the common gas tar produced at gas works and is a good preservative of wood, metal and other surfaces to which the paint is applied. The Japan drier causes the paint to dry rapidly and with a dry, smooth surface.

I find that the proportions are substantially essential. Too much of any one of the ingredients will alter the balance of the composition and destroy or diminish the effectiveness. Thus too much oil of tar will make the paint sticky in the sun and runny; too much of the filler or pigment (Princes metallic) will make it short and crumbly; too much of the gloss oil will make it brittle; and too liable to crack on drying. Too much Japan will make it brittle and liable to crack under the impact of missiles or hail.

My paint is especially useful for roofs, brick walls, box cars, railroad bridges, smoke stacks and water towers and other like structures.

Having thus described my invention I claim:

The herein described paint compound, consisting substantially of the following: oil of tar, fifty gallons, Princes metallic, three hundred and fifty pounds, gloss oil, five gallons, Japan drier, seven and one-half gallons.

In testimony whereof I hereunto affix my signature in the presence of two witnesses.

JOHN F. COE.

Witnesses:
 JAS. A. KEMPER,
 J. R. GREENLEE.

Copies of this patent may be obtained for five cents each, by addressing the "Commissioner of Patents, Washington, D. C."